Sept. 29, 1970    C. E. LAND ET AL    3,531,182
MULTIREMANENT FERROELECTRIC CERAMIC OPTICAL DEVICES
Filed Sept. 11, 1968    2 Sheets-Sheet 1

Cecil E. Land
Donald G. Schueler
INVENTORS

BY

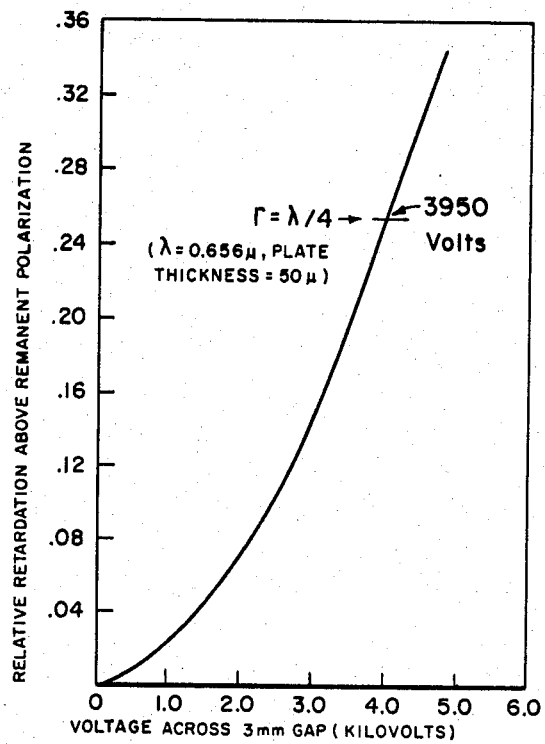
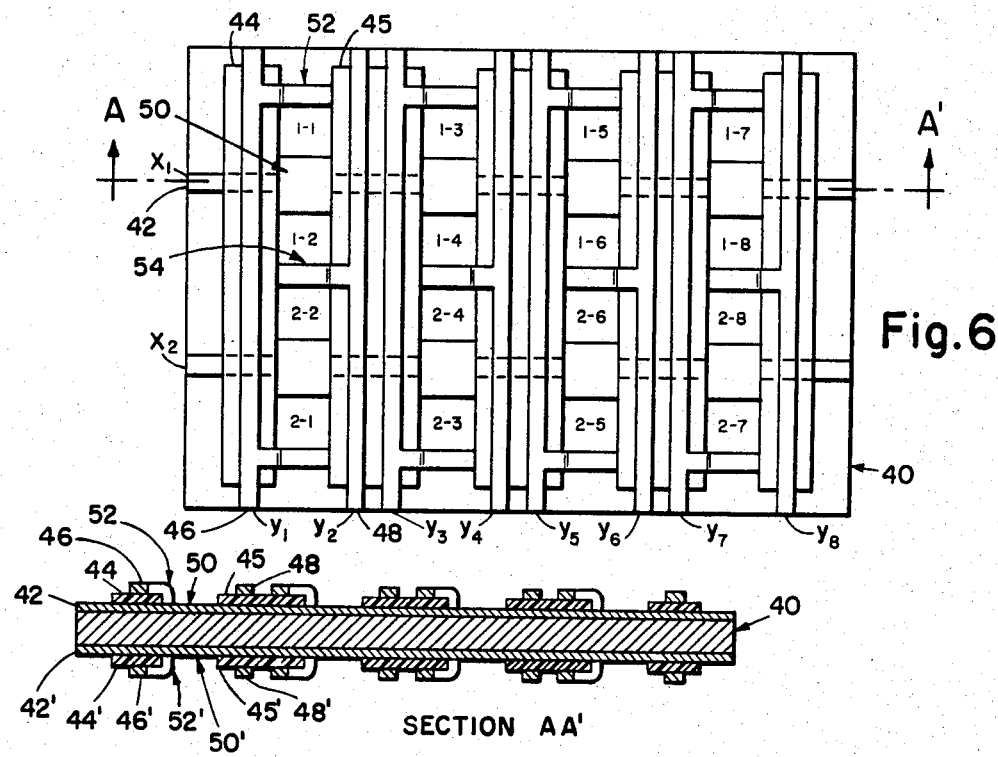

United States Patent Office 3,531,182
Patented Sept. 29, 1970

3,531,182
MULTIREMANENT FERROELECTRIC CERAMIC
OPTICAL DEVICES
Cecil E. Land and Donald G. Schueler, Albuquerque,
N. Mex., assignors to the United States of America as
represented by the United States Atomic Energy Commission
Filed Sept. 11, 1968, Ser. No. 758,958
Int. Cl. G02f 3/00
U.S. Cl. 350—150                                         13 Claims

ABSTRACT OF THE DISCLOSURE

Plane polarized light, optical retardation devices comprising a hot-pressed, fine grained, ferroelectric ceramic plate having an initial ferroelectric remanent polarization and means for changing the magnitude of said remanent polarization for varying the optical retardation of said plate.

BACKGROUND OF INVENTION

The present invention relates to electro-optical systems which exhibit the property commonly referred to as optical retardation. By optical retardation is meant the conversion, in a birefringent optical device, of monochromatic plane polarized light into another polarization form, such as elliptical or circular polarization. A monochromatic plane polarized light beam incident on an optically uniaxial birefringent device may be resolved into two ortogonal plane polarized components, for instance a fast and slow component (i.e. for a negative birefringent device the extraordinary ray and the ordinary ray) corresponding to the smaller and larger refractive indices along the $c$ and $a$ crystalline axes in the optical device. As the orthogonal components of the incident plane polarized light pass through a birefringent optical device, the components propagate through the device at different velocities changing the phase relationship between the components. After the components have traversed the optical device, they are reunited to form a single elliptically polarized beam.

Prior systems have used the properties of birefringence in ferroelectric single crystals to vary the polarization state of the light transmitted through the crystal. In these systems, when a plane polarized light beam is directed towards one surface of a birefringent crystal which elliptically polarized the transmitted light beam, an analyzer positioned with its axes at 90 degrees with respect to the incident polarized light beam may pass polarized light which includes a component on the analyzer axis which may then be sensed by a photosensitive device. Light transmittance in these prior systems may be varied by changing the birefringent properties of the ferroelectric crystals.

In some systems this is effected by heating a birefringent ferroelectric crystal slightly above its Curie temperature where it becomes paraelectric and optically isotropic. An electric field applied across the crystal enforces the ferroelectric phase and the crystal again becomes birefringent. The birefringence is proportional to the square of the electric field, hence the device exhibits the Kerr electro-optic effect. When the electric field is removed, the crystal again becomes optically isotropic. Such systems required precise temperature controls and heating or cooling means in order to maintain the crystal in a narrow temperature range near its Curie temperature.

Other prior systems utilized ferroelectric single crystal plates having either the $c$ or $a$ crystallographic direction parallel to the major surfaces. Small localized areas of the plate were switched by 90 degrees by an applied electric field of proper magnitude and direction, thereby varying the birefringence and retardation properties of the crystal. With the crystal positioned between crossed polarizers, the change in birefringence may result in a corresponding change in transmittance of polarized light through the polarizer-crystal-analyzer combination. When the polarization potential is removed, the crystal relaxes back to its initial state in a relatively short time. For example, in barium titanate the decay time of localized $a$-domains in a $c$-domain crystal may be of the order of a microsecond or less, while for $c$-domains in an $a$-domain crystal, the decay time may be of the order of minutes or hours since in single crystals, perpendicularly switched domains are opposed by high localized strain fields.

The width of the transition region or fringe between the perpendicularly switched area and the surrounding unswitched area in single crystals may be of the order of the crystal thickness. The fringe width and accordingly the crystal thickness may in many instances limit the number of localized switched areas which may be provided on a given crystal.

The prior optical retardation systems noted above generally provided only an on-off binary "0" and "1" capability. There are many applications in modern technology for devices having more than two stable states such as in ternary and octonary storage devices, in analog memories, and in their associated logic circuits.

It has been found in prior polycrystalline ferroelectric ceramics that the ceramic may be given lasting polarizing properties, including pyroelectric and piezoelectric effects, under the influence of suitable electric fields. In the thermally depoled state, the ferroelectric domains within the crystallites or grains are randomly oriented so that the ceramic is isotropic on a macroscopic scale. When a poling field is applied, domains oriented favorably with respect to the field grow at the expense of less favorably oriented domains which may result in anisotropic responses to small-signal electrical and optical stimuli. The electro-optical behavior of these polarized ceramics may be divided into two functional classes depending primarily on the grain sizes in the ceramic. Coarse grained ceramics, that is ceramics having nominal grain sizes generally greater than about 2 microns, almost completely depolarize transmitted light and scatter the light in distinct, spatial distributions dependent on direction of electrical poling. Poled fine grained ceramics, that is ceramics having nominal grain sizes generally about 2 microns or less, are birefringent and exhibit orthotropic symmetry with respect to the optic axis (the ceramic polar axis or direction of electrical poling). The light transmission characteristics of an optical network consisting of a polarizer, ceramic plate and analyzer may be changed incrementally by varying the direction of the ceramic optic axis in a plane perpendicular to a beam of polarized light passing through the network to change the intensity of the transmitted light beam in multiple steps.

These ceramics have the property that small, localized areas of a thin plate may be stably and multiply switched independently without affecting the light transmission characteristics of the surrounding area, except for a narrow "fringe" around each switched area. The width of the fringe is a function of grain size substantially independent of ceramic thickness.

SUMMARY OF INVENTION

It is an object of this invention to provide a novel ferroelectric ceramic optical retardation device having two or more optically distinguishable information storage or display states with erase and rewrite capabilities.

It is a further object of this invention to provide a ferroelectric optical retardation device in which the retardation may be incrementally or continuously varied without irreversible domain switching.

It is a further object of this invention to provide a ferroelectric ceramic electro-optical device which may exhibit multicolor display characteristics.

It is a further object of this invention to provide a ferroelectric ceramic optical modulator or shutter.

Various other objects and advantages will appear from the following description of one embodiment of the invention, and the most novel features will be particularly pointed out hereinafter in connection with the appended claims.

The invention comprises a plane polarized light, optical retardation device comprising a hot-pressed, fine grained, ferroelectric ceramic plate having an initial remanent polarization and means for changing the magnitude of said remanent polarization for varying the optical retardation of said plate.

DESCRIPTION OF DRAWINGS

The invention is shown in the accompanying drawings wherein:

FIG. 5 is a graph showing the variation of retardation with applied electric field above saturation remanence;

FIG. 6 is an elevation view of a matrix array electrode configuration on a ferroelectric ceramic element; and FIG. 7 is a cross-sectional view taken along line A-A' of the matrix array shown in FIG. 6.

DETAILED DESCRIPTION

Figure 1:
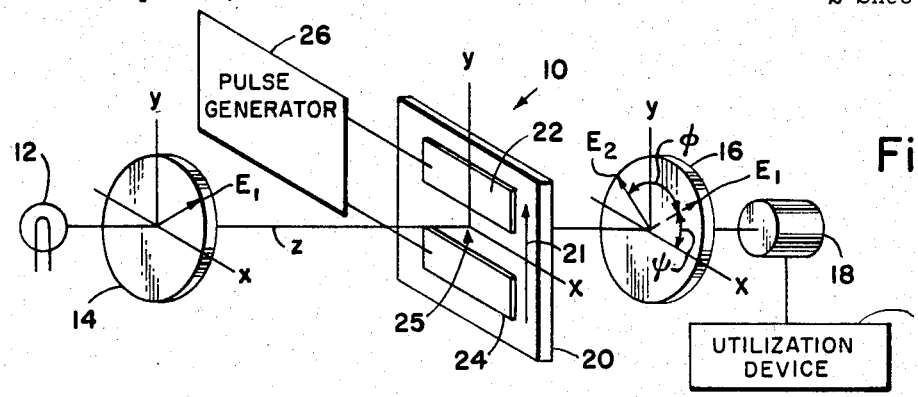
FIG. 1 is a diagrammatic view partially in perspective of an electro-optical retardation system including a fine grained, ferroelectric ceramic element and electrode arrangement for varying the birefringence of the element.

An embodiment of the invention is shown in FIG. 1 in conjunction with a typical optical system. The system includes an electrically controlled optical retardation device 10, a light source 12, a linear polarizer 14 and linear analyzer 16, each having a preferred transmission direction as indicated by the arrows $E_1$ and $E_2$, a suitable photosensitive device 18, such as a photomultiplier or photodiode, and a utilization device 19. Each element may be arranged along the z axis as shown at desired angular relationships to the x and y axes as specified below. Light source 12 may be any conventional ordinary or white light source, such as an incandescent or mercury arc lamp, or for certain applications a monochromatic or narrow band light source, such as a laser or filtered light source, which may project a beam of light along the z axis. The light souce may also include standard collimating means including special lens or fiber optics systems. The optical retardation device 10 effectively controls the color of light from a white source or intensity of light from a monochromatic source which impinges upon the photosensitive device 18.

The optical retardation device 10 includes an optically uniaxial, polycrystalline ferroelectric ceramic, thin polished plate or member 20 having a multiplicity of grains with uniform nominal grain diameters typically less than about 2 microns with an initial uniform remanent polarization, a density greater than about 98% theoretical, and maximum homogeneity, light transmission, surface smoothness and tensile strength. Typically, such materials must be hot pressed to achieve these properties. The maximum grain diameter may be dependent upon the particular ferroelectric composition being used and may be greater than 2 microns in some instances. Ferroelectric ceramics having the desired electro-optical properties will be hereinafter referred to as fine grained ceramics. Plate 20 is shown for purpose of illustration in FIG. 1 with an exaggerated thickness. Fine grained, ferroelectric ceramic plates have exhibited the desired light transmission and retardation properties of this invention with different thickness in the range of 20 to 250 microns depending on the optical transparency of the material.

An optically uniaxial ferroelectric ceramic for purposes of this invention, is one in which the poled or polarized ceramic is effectively optically uniaxial, i.e., it exhibits the symmetry properties of an optically uniaxial, birefringent crystal. The individual grains or crystallites of an optically uniaxial ceramic may exhibit either uniaxial (tetragonal, trigonal (rhombohedral), and hexagonal) symmetry or the generally biaxial (orthorhombic, monoclinic, and triclinic) symmetry. A poled, fine grained ferroelectric ceramic is generally optically birefringent in a plane parallel to the poling direction. If the individual crystallites exhibit negative birefringence, the electrical polar direction is the fast axis of the ceramic; if the crystallites exhibit positive birefringence, the electrical polar direction is the slow axis of the ceramic. The effective birefringence in a ferroelectric ceramic plate depends upon the degree or magnitude of electrical poling in a given direction, i.e., whether the ceramic is fully or only partially poled in a particular direction. The orientation of the optic axis depends upon the direction of electrical poling in the ceramic, which in the embodiment shown in FIG. 1 is initially in the direction of arrow 21 parallel with the y axis. It has been found that electric control of the light transmission properties of the retardation device 10 may be effected by varying the magnitude of its ferroelectric polarization by the application of an external electric field. An electric field may be applied to plate 20 by suitably selected pulses applied across a pair or set of electrodes 22 and 24 oppositely disposed across and separated by a single localized polarization area 25 on a major surface of the plate as shown and aligned with the initial uniform optic axis orientation of plate 20. A second set of electrodes (not shown) may be positioned on the opposite surface of plate 20 directly opposite and aligned with electrodes 22 and 24 and connected in parallel therewith to insure uniform field distribution throughout the entire thickness of plate 20 in area 25.

A suitable pulse of appropriate polarity, amplitude and pulse width may be applied across electrodes 22 and 24, by any conventional pulse generating means 26 to generate electric poling or switching fields between the electrode pair parallel to the plane of the surface at which the electrodes are disposed and parallel to the original poling direction 21. The pulse amplitude and width may be adjusted to produce partial or incremental switching of the ceramic polarization. The pulse amplitude is adjusted to produce the required switching speed; the pulse width is adjusted to produce the desired change in polarization. It has been discovered that incremental switching of the ceramic polarization produces corresponding incremental changes in the effective birefringence of the ceramic plate. Typical pulse widths and pulse amplitudes may be about 0.1 microsecond to 100 microseconds and about 5 to 40 kilovolts per centimeter depending on the plate thickness and composition.

Ceramic plate 20 may be any hot-pressed, ferroelectric ceramic solid solution, such as barium titanate, sodium potassium niobate and lead zirconate-lead titanate, having a grain size less than about 2 microns, high density and a high degree of homogeneity. Typical ferroelectric ceramics may be the lead zirconate-lead titanate solid solution having the general formula

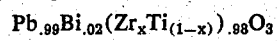

where x may vary from about .95 to .45. The additive may be, including bismuth, any suitable material such as lanthanium and niobium from about .1 to 4 atom percent. One typical ceramic may have a ratio of 65 mol percent $PbZrO_3$ and 35 mol percent $PbTiO_3$ and contain 2 atom percent Bi as $Bi_2O_3$. These solid solutions may be prepared in the following manner: (1) weighing the chemical oxide powders, (2) wet mixing in a suitable liquid medium (3) drying, (4) calcining at a temperature of about 800° C. for about 1 hour, (5) granulation or wet milling of the calcine to break down the partially sintered particle aggregates, (6) drying, (7) cold pressing of the powder into a slug and then (8) hot pressing at a temperature from about 800° C. to about 1050° C. for from about 1 to 24 hours at a pressure from about 500 to about 20,000 p.s.i. The grain size may be controlled by the proper choice of chemical modifiers or additives which enhance the desirable electric properties yet inhibit grain growth (such as $Bi_2O_3$, $Sb_2O_3$, $La_2O_3$ and $Nb_2O_5$), by the selection of raw material oxide powders which are of sufficient chemical purity (generally greater than about 99.2%) and by the proper selection of the hot pressing conditions of temperature, time and pressure. After hot pressing, the slug may be sliced into thin wafers or plates and the major surfaces polished to an optical quality finish. The plates may then be annealed at about 500 to 700° C. for about 15 minutes, cooled to room temperature, electrodes positioned or plated on, and the plate electrically polarized to the desired uniform initial polarization. The material exhibits the desired electro-optical properties at room temperature. The material may be prepared with a desired grain size by selecting the appropriate hot pressing parameters. For instance, in order to produce a grain size of about 1 micron, the calcined slug may be hot pressed at a temperature of about 1000–1050° C. for about 4 hours at about 8000 p.s.i.

Figure 2:
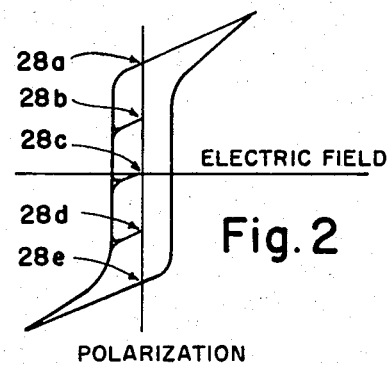
FIG. 2 is a graph of polarization vs. applied electric field for the ferroelectric element of FIG. 1.

In a hot pressed, ferroelectric ceramic plate having an initial ferroelectric polarization, grains switched by a localized field may be opposed by strain fields which are small compared to those in a single crystal. Therefore, the switched area may not tend to relax back into the original polar state, but remains indefinitely until an appropriate switching field may be applied to change the orientation. Further, these fine grained, ferroelectric ceramics may be incrementally switched by 180° to any one of a plurality of stable polarization states, shown at points 28a, 28b, 28c, 28d, and 28e in FIG. 2, between zero and either positive or negative saturation remanence polarization ($P_r$) by proper selection of switching pulses. Typical ferroelectric ceramics may have 10 or more stable polarization states above zero polarization.

Figure 3:
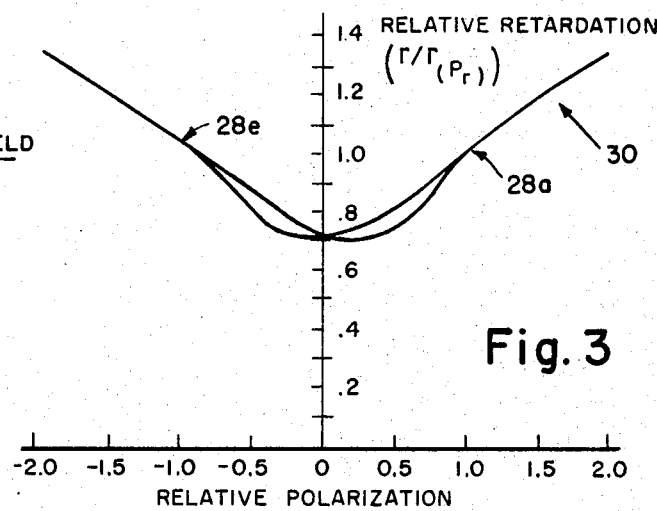
FIG. 3 is a graph of retardation vs. polarization for the ferroelectric element of FIG. 1 using a particular ferroelectric composition.

The effect of magnitude of poling on normalized retardation $\Gamma/\Gamma(P_r)$, where $\Gamma(P_r)$ is the retardation at positive and negative saturation remanence, points 28a and 28e, is shown in FIG. 3. A lead zirconate-lead titanate solid solution ceramic plate having the formulation

Figure 4:
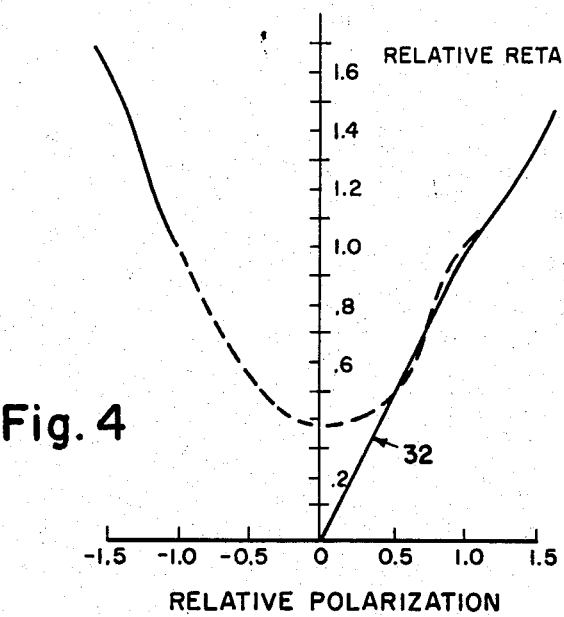
FIG. 4 is a graph of retardation vs. polarization for another ferroelectric composition.

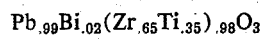

was initially poled to positive saturation remanence parallel to the major surfaces and perpendicular to electrodes 22 and 24. The retardation was measured for this remanence state. The ceramic polarization was then switched incrementally from positive to negative saturation remanence and the retardation measured at each intermediate remanence state. FIG. 3 shows that as the relative polarization is switched from positive saturation remanence at +1.0 toward zero (the electrically depoled condition), the relative retardation decreases by about 30 percent. As the relative polarization is switched from 0 to negative saturation remanence at −1.0, the relative retardation increases to the original value at +1.0. Reversing the polarity of the switching field and repeating the retardation measurements as the relative polarization is switched from −1.0 to +1.0 yields the completed closed curve in FIG. 3. The two curves differ due to strain hysteresis. Although the closed curve shows a 30 percent variation in retardation as the polarization is switched from one saturation remanence to the other, as high as 70 percent variations have been measured for slightly different ceramic compositions such as is shown in FIG. 4 for a lead zirconate-lead titanate solid solution having the formulation $Pb_{.99}La_{.02}(Zr_{.65}Ti_{.35})_{.98}O_3$. This figure also illustrates the retardation as a function of polarization for a sample that is initially thermally depoled or in a "random" polarization state. The birefringence of the thermally depoled sample is zero and increases nearly linearly with polarization on the initial polarization cycle as shown by curve 32. This portion of the curve may also be used for "single-shot" type applications of this invention with repeatability occurring on thermal depolarization.

When an electric field is applied at saturation remanence in the saturation direction, the relative retardation and polarization are further increased beyond point 28a as shown by curve 30 in FIG. 3. An electric field applied in this manner does not produce irreversible domain switching; hence, when the field is removed, the retardation returns to its original value at saturation remanence. This reversible electro-optic effect may be potentially useful for light modulation and "momentary open" shutter applications as described below. FIG. 5 illustrates the reversible electro-optic effect above saturation remanence in a lanthanum doped lead zirconate-lead titanate ($x=.65$) ceramic. The retardation varies roughly as the square of the applied electric field. A quarter wavelength change in retardation may be produced by a field of 1.32 kv. per millimeter of spacing between electrodes for a plate 50 microns thick. Greater retardation changes may be achieved relative to applied voltage by increasing plate thickness.

It should be noted that the effective birefringence is maximum when the angle between the ceramic polar axis and the light propagation direction is 90°; it is zero when the angle is 0°.

Variations in effective birefringence may be detected when the ceramic plate is placed between a linear polarizer and analyzer as indicated in FIG. 1. The light intensity transmitted into a detector from a monochromatic source or the dominant wavelength transmitted through the optical network of FIG. 1 from a white source depends on the magnitude of electrical poling and the direction of the ceramic polar axis. With the ceramic polar axis lying in the xy plane and oriented with respect to the polarizer axis $E_1$ so that $\psi - \alpha = \pm 45°$ (where $\alpha$ is the angle between the ceramic polar axis and the x axis) and with monochromatic incident light of wavelength $\lambda_0$, transmitted light emerging from the ceramic plate is, in general, elliptically polarized. However, if the thickness of the ceramic plate is such that the retardation $$\Gamma_1 = \frac{(2N-1)}{2} \lambda_0$$

where N is an integer, then the transmitted light emerging from the ceramic plate is linearly polarized, but at −90° to the incident beam. If $\Gamma = \Gamma_1$ and $\phi = 0$, no light appears at the output of the analyzer. Similarly, if $\Gamma_2 = N\lambda_0$, the light emerging from the ceramic plate will again be linearly polarized, but aligned with the polarization of the incident beam. Therefore, if $\Gamma = \Gamma_2$ and $\phi = 90°$, no light is transmitted by the network.

With the network set at an extinction condition such as either of those described above, a change in retardation allows light to be transmitted by the optical network, just as though a shutter had been opened. Therefore, if the ferroelectric polarization is switched by a discrete increment from its value at the extinction condition, the shutter may be opened. If it is then switched back to its original value at saturation remanence, the shutter may be closed.

With the network initially set at an extinction condition, a change in retardation, $\Delta\Gamma = \lambda_0/2$ will produce maximum light transmission through the network. Incremental changes in retardation less than $\lambda_0/2$ will result in light transmission at intermediate values between zero and maximum. Therefore, the light gate need not be simply an on-off device, but may be operated as a multi-state light valve. Experimental results indicate that as many as 10 or more discrete transmittance levels may be possible with this type of device.

If the ceramic plate is initially poled to saturation remanence and the network of FIG. 1 adjusted for extinction, an electric field applied in the saturation direction may allow light to be transmitted by the network. Since no irreversible domain switching occurs, the retardation may return to its original value at saturation remnance when the field is removed. A typical reversible retardation versus field characteristic is shown in FIG. 3 by curve 30 as polarization increases beyond the saturation remanence $P_r$. The light transmission occurring for a given applied field may be readily predicted mathematically. In this mode of operation, the ceramic in conjunction with the polarizer and analyzer, again acts as a light valve. The transmittance of the network depends on the applied field.

Because of the unique localized switching properties of ferroelectric ceramic plates, arrays of light shutters, valves or modulators may be achieved using a single ceramic plate, as shown in the 4 x 4 matrix in FIGS. 6 and 7 with information locations from 1—1 to 2–7. With monochromatic light or white light for interrogation, an array of multistate light valves on a ceramic plate may become a multistate memory which may be read optically and switched or changed by conventional switching and logic circuits (not shown) connected to x-address electrodes $x_1$ and $x_2$ and y-address electrodes $y_1$ to $y_8$. Such an array, as shown in FIGS. 6 and 7 and described with respect to information locations 1—1 and 1–2, may consist of a properly prepared, optical quality ferroelectric ceramic plate 40, an x-address electrode 42 ($x_1$), a y-address electrode pair 46 and 48 ($y_1$ and $y_2$), and insulating layers 44 and 45 intermediate the x- and y-address electrodes. The x-address electrode 42 may include a widened portion or land 50 directly applied to the surface of plate 40 at each of the information locations. The y-address electrode 46 may include an ear tab 52 perpendicularly extending therefrom towards electrode 48 and parallel to land 50. The y-address electrode 48 likewise may include an ear or tab 54 perpendicularly extending therefrom towards electrode 46 and parallel to land 50 but on the side opposite tab 52. Tabs 52 and 54 may include a first portion extending along the surface of insulating layers 44 and 45 respectively to the edge thereof and a second contacting portion applied directly to the surface of plate 40 as shown in FIG. 7. This second contacting portion of tabs 52 and 54 and the widened portion 50 of x-address electrode 42 preferably are of generally rectangular or square configuration with sharp corners with good contact to plate 40 to insure a uniform electric field distribution within each information location and minimization of "crosstalk" between information locations. Since information location 1—1 is bounded by insulating layers 44 and 45, the second portion of tab 52 and widened portion 50, location 1—1 may be switched by the application of a suitable pulse between electrodes 42 and 46. Information location 1–2 may be switched by the application of a suitable pulse between electrodes 42 and 48. The electric field distribution may be further improved by provision of a duplicate set of suitably interconnected electrodes on the opposite surface of ceramic plate 40 as shown in FIG. 7 by the corresponding numbered electrodes 42′, 46′ and 48′, insulating layers 44′ and 45′, land 50′ and tab 52′. The electrodes, such as electrodes 42 and 42′, may be connected together by a conductive layer aplpied over the end of plate 40 which may permit interconnection of the matrix array to other circuitry by conventional printed circuit plug-in techniques. This same electrode configuration may be repeated for the remaining information locations.

Electrodes 42, 46 and 48 may be formed of any suitable conductive material, either transparent or opaque, which may be applied to the plate with the desired dimensions and conductivity. Insulating layers 44 and 45 may be any suitable insulating material, either transparent or opaque, which may be conveniently applied in the desired configuration such as silicon monoxide.

The x-address electrodes may be first deposited on the ceramic plate with conventional evaporation or other deposition and masking techniques. The insulating layers and y-address electrodes may then be deposited in appropriate order, as shown, over the x-address electrodes to complete the matrix. The insulating layers should be sufficiently thick to withstand the switching voltages applied between the x-address and y-address electrodes. As an alternative embodiment, widened portions 50 on the x-address electrodes may be eliminated and greater bit or information density obtained by applying insulating layers between the x-address electrodes and the ceramic plate directly below insulating layers 44 and 45. In this embodiment, the x-address electrodes would contact the ceramic plate in a generally rectangular configuration with the desired sharp corners, similar to tabs 52 and 54 on the y-address electrodes.

In the configuration shown in FIGS. 6 and 7, the y-address electrodes and x-address electrodes may be typically 0.001 inch in width and widened portions of the x-address electrodes may be about 0.003 inch square. For these electrode dimensions the locally switched areas may be about 0.003 inch by 0.003 inch with up to about 50% of the plate as information areas. The bit density of such an array thus may be about 25,000 bits per square inch.

An xy addressed array such as that shown in FIGS. 6 and 7, of multistate light valves on a single ceramic plate may be used as a display device. If the display is illuminated with monochromatic light, the light transmission through the optical network is controlled by the incremental polarization state of the ceramic plate at each display site. By virtue of incremental control of the transmittance at each display site, the display possesses an effective gray scale.

An xy addressed array of momentary open shutters or valves would be satisfactory for use as a short persistence display. This device has the advantage that no irreversible domain switching is required of the ceramic.

If the light incident on the networks of FIG. 1 or FIG. 6 is a white light, each Fourier component of the light may be retarded by an amount depending upon the component frequency. The transmittance maxima and minima may occur simultaneously at different wavelengths in the spectrum. The result is, providing $\Gamma < 1200$ manometers (millimicrons), that one band of frequencies may be transmitted while others may be essentially extinguished. For example, with $\phi = 90°$ and $\psi - \alpha = \pm 45°$, the transmittance T is maximum when $$\lambda = \frac{2\Gamma}{2N-1}$$

and minimum when $\lambda = \Gamma/N$, N being an integer. If, for example, $$\frac{2\Gamma}{2N-1} = 0.550 \text{ micron}$$

the network may transmit green light ($\lambda = 0.550$ micron and adjacent wavelengths) and extinguish components toward both the red and violet edges of the visible. Since $\Gamma$ is a function of the remanent polarization, it follows that as the polarization is switched, $\Gamma$ changes, and the maxima and minima of transmittance may be satisfied at other wavelengths. This simply means that as the polarization is switched incrementally, the light transmitted by the network of FIG. 1 may change from green to yellow to red. If an array of incrementally switched areas is arranged on a single ceramic plate the result is a multicolor display.

An *xy* array of momentary open shutters or valves illuminated by a white light source, may also be used as a short persistence multicolor display. In this device, the color at a given display site may depend on the electric field applied at that site. This type of device has the advantage that no irreversible domain switching is required of the ceramic.

A ceramic electro-optic light modulator may operate about some fixed retardation, depending on the remanent polarization, with the modulating field producing a corresponding variation in retardation. For small-signal modulating fields, the variation in retardation is linear: at higher modulating fields the retardation varies as the square of the applied field, as indicated in FIG. 5. When the ceramic remanent polarization is switched by a discrete increment from its initial value the relationship between retardation and applied modulating field (i.e., the modulation index) also changes by a discrete value. This results in an electrically variable modulation index.

In addition to devices such as those described above which utilize a single ceramic plate in conjunction with a linear polarizer and analyzer, many novel devices may utilize two or more ceramic plates. As an example a coincidence addressed memory may consist of an alterable memory on one ceramic plate and a permanent memory on a second plate. The complete optical network may then consist of a linear polarizer, the permanent memory, the alterable memory and a linear analyzer arranged in a configuration similar to that shown in FIG. 1. If the individual bits of the permanent memory are arranged to coincide spatially with those on the alterable memory and the permanent memory bits are switched at an angle of 90° degrees with the alterable memory bits, and if the retardation of the two ceramic plates are equal at saturation polarization, then when the permanent memory coincides exactly with the alterable memory complete extinction is obtained with crossed polarizer and analyzer. If the two memories do not coincide completely, the transmitted light intensity may then be proportional to the correlation function for the two memories. Coincidence address may also be achieved optically by a system such as this.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. An electro-optical device comprising: a fine grained, hot-pressed, optically birefringent ferroelectric ceramic plate having a multiplicity of domains and grains and a plurality of stable electrical polarization states above zero electrical polarization in any direction and an initial remanent electrical polarization at one of said states in a given direction; means for supplying polarized light to said plate; means for varying the magnitude of the electrical polarization of domains in said direction of said plate to different levels of polarization and for varying the magnitude of said birefringence to a plurality of different distinguishable levels; and means for sensing the variation of said birefringence.

2. The device of claim 1 wherein said sensing means includes a linear analyzer arranged to receive light passing through said plate.

3. The device of claim 2 wherein the means for supplying polarized light includes a monochromatic light source.

4. The device of claim 3 wherein said sensing means includes means for measuring the intensity of light passing through said linear analyzer.

5. The device of claim 2 wherein the means for supplying polarized light includes a white light source.

6. The device of claim 5 wherein said sensing means includes means for measuring the wavelength of light passing through said linear analyzer.

7. The device of claim 1 wherein said polarization varying means includes a pair of electrodes disposed adjacent said plate aligned with said initial remanent polarization.

8. The device of claim 7 including pulse generator means connected across said electrodes for applying electric fields of selected polarity and duration through the plate for incrementally varying the magnitude of the electrical polarization.

9. The device of claim 7 including a matrix array of said electrode pairs.

10. The device of claim 9 wherein said electrodes are rectangularly shaped to provide a uniform electric field distribution between each electrode pair.

11. The device of claim 7 wherein said initial remanent polarization is at saturation remanence and said polarization varying means includes means for increasing the polarization magnitude above said saturation remanence.

12. The device of claim 1 including means for switching domains of said plate from one stable polarization state to another stable polarization state.

13. A method of producing an optical display comprising passing a beam of polarized light through a fine grained, optically birefringent ferroelectric plate having an initial remanent electrical polarization at an initial one of a plurality of stable states; sensing the light passing through said plate and a linear analyzer; changing the magnitude of said remanent electrical polarization.

References Cited

Buessem: "Phenomenological Theory of High Permittivity in Fine-Grained Barium Titanate," J. Am. Ceram. Soc., vol. 49 (January 1966), pp. 33–36.

Cummins: "A New Optically Read Ferroelectric Memory," and "A New Bistable Ferroelectric Light Gate or Display Element," vol. 55, Proc. IEEE (August 1967), pp. 1536–1538.

Land: "Ferroelectric Ceramic Electrooptic Storage and Display Devices," Sandia Corporation Reprint SC-R-67-1219 (October 1967), received in Scientific Library Jan. 24, 1968.

DAVID SCHONBERG, Primary Examiner

P. R. MILLER, Assistant Examiner

U.S. Cl. X.R.

350—157